United States Patent [19]

Kyoya et al.

[11] Patent Number: 4,918,924
[45] Date of Patent: Apr. 24, 1990

[54] TURBOCHARGING PRESSURE CONTROLLING APPARATUS

[75] Inventors: Michio Kyoya, Sagamihara; Katsuhiko Fukuzumi, Sanda, both of Japan

[73] Assignees: Mitsubishi Denki Kabushiki Kaisha; Mitsubishi Jukogyo Kabushiki Kaisha, both of Tokyo, Japan

[21] Appl. No.: 254,025

[22] Filed: Oct. 6, 1988

[30] Foreign Application Priority Data

Oct. 7, 1987 [JP] Japan ............................ 62-153875[U]

[51] Int. Cl.$^5$ ............................................. F02B 37/12
[52] U.S. Cl. ........................................ 60/602; 92/167
[58] Field of Search ............... 60/600, 601, 602, 603; 92/167, 168

[56] References Cited

U.S. PATENT DOCUMENTS 4,437,311 3/1984 Iwamoto et al. .................... 60/602
4,549,470 11/1985 Yogo .................................... 92/94

FOREIGN PATENT DOCUMENTS 2929419 1/1981 Fed. Rep. of Germany .
3037490 4/1981 Fed. Rep. of Germany .
 206728 12/1982 Japan .................................... 60/602
61-39841 11/1986 Japan .
2056587 3/1981 United Kingdom .

Primary Examiner—Michael Koczo
Attorney, Agent, or Firm—Sughrue, Mion, Zinn, Macpeak & Seas

[57] ABSTRACT

A turbocharging pressure controlling apparatus employing a diaphragm-type single acting air actuator includes a rod 33 to which is connected a control valve 13 for regulating the opening of a flow dividing hole 15 provided in an exhaust pipe 16 and which enlarges the degree of opening by a retracting motion, thereby reducing exhaust gas pressure for rotating a turbocharger that produces a turbocharging pressure and thus reducing the generation of turbocharging pressure. Through this arrangement the effect of operating directions of the rod upon the mounting position for the apparatus can be minimized. Therefore, the apparatus is not limited by the mounting position, as there is no effect thereon by the motion of the rod.

1 Claim, 1 Drawing Sheet

TURBOCHARGING PRESSURE CONTROLLING APPARATUS

BACKGROUND OF THE INVENTION

1. Field of the Invention

This invention relates to a turbocharging pressure controlling apparatus for controlling the pressure of air to be supplied to an internal combustion engine from a turbocharger rotated by exhaust gas from the internal combustion engine and, more particularly, to improvements in minimizing the mounting space therefor.

2. Description of the Prior Art

FIG. 1 is a sectional view showing an example of a conventional turbocharging pressure controlling apparatus. In FIG. 1, numeral 1 designates a bracket mounted to an internal combustion engine (not shown), a case 2 being mounted to the bracket 1. In the case 2 there is provided a rubber-made diaphragm 3 held between a positive pressure side holder 4 and an atomspheric side holder 5 so that the interior of the case 2 is divided into two chambers, namely, an atmospheric chamber 6 and a positive pressure chamber 7. A spring holder 9 is disposed on the interior surface of the atmospheric chamber 6, and is opposite to the atmospheric side holder 4, and between the spring holder 9 and the atmospheric side holder 4 there is provided a spring 8 which normally urges the diaphragm 3 toward the positive pressure chamber 7. A nipple 10 is mounted to the case 2, its front end facing one side wall of the positive pressure chamber 7. One side wall of the atmospheric chamber 6 is provided with a hole 11 through which the chamber 6 communicates with the open air. A rod 12 is mounted movably back and fourth, extending through the spring holder 9 and the case 2, its base end being fixed to the atmospheric-side holder 5 and positive pressure-side holder 4.

A control valve 13 is mounted to the front end of the rod 12 through a link 14. The valve 13 has a function to adjust the degree of opening of a flow dividing hole 15 bored in an exhaust pipe 16 for guiding exhaust gas to a turbocharger (not shown) which operates to increase the pressure of air to be supplied to the internal combustion engine. Through this adjustment the pressure of air to be supplied from the turbocharger to the internal combustion engine is regulated.

The conventional turbocharger pressure controlling apparatus is constructed as above described, so that the rod 12 is caused to extend outwardly against the biasing force of the spring 8 by air of several atmospheres being introduced through the nipple 10 into the positive pressure chamber 7, the flow dividing hole being then opened by the control valve 13. As a consequence, the amount of exhaust gas to be supplied to the turbine is reduced and the rotation speed of the turbine is lowered, the amount of air to be supplied to the internal combustion engine being thus decreased.

With the conventional turbocharging pressure controlling appartus of such arrangement, when the pressure of air to be supplied to the internal combustion engine is lowered, the rod 12 is caused to operate in the direction of arrow A, and therefore the apparatus involves the difficulty that, when mounting the apparatus to an internal combustion engine, its mounting position is sometimes limited.

SUMMARY OF THE INVENTION

This invention is intended to overcome the foregoing difficulty, and accordingly it has as its object the provision of a turbocharging pressure controlling apparatus in which its rod performs a retracting motion to reduce the pressure of air to be supplied to an internal combustion engine so that, when mounting the apparatus to the internal combustion engine, the mounting position therefor is not subjected to any limitation.

The above and further objects and features of the invention will more fully be apparent from the following detailed description with accompanying drawings.

DESCRIPTION OF THE PREFERRED EMBODIMENTS

Figure 1:
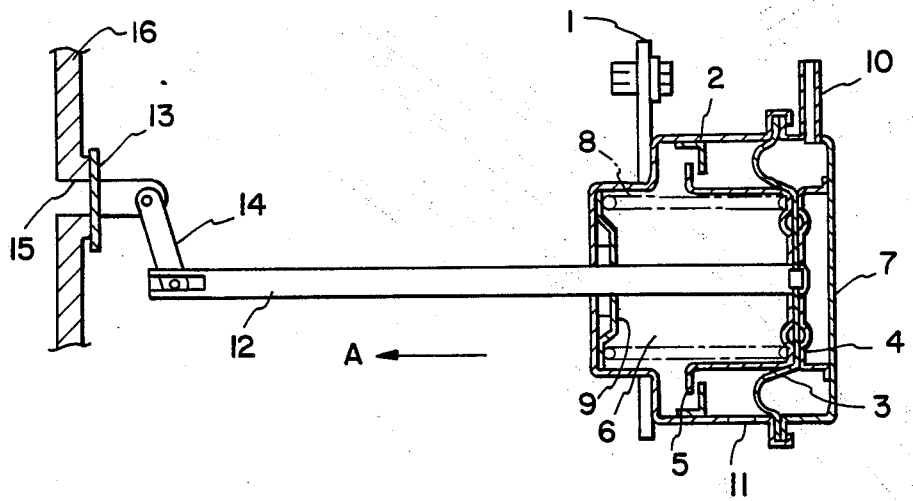
FIG. 1 is a sectional view showing an example of a conventional turbocharging pressure controlling apparatus.
Figure 2:
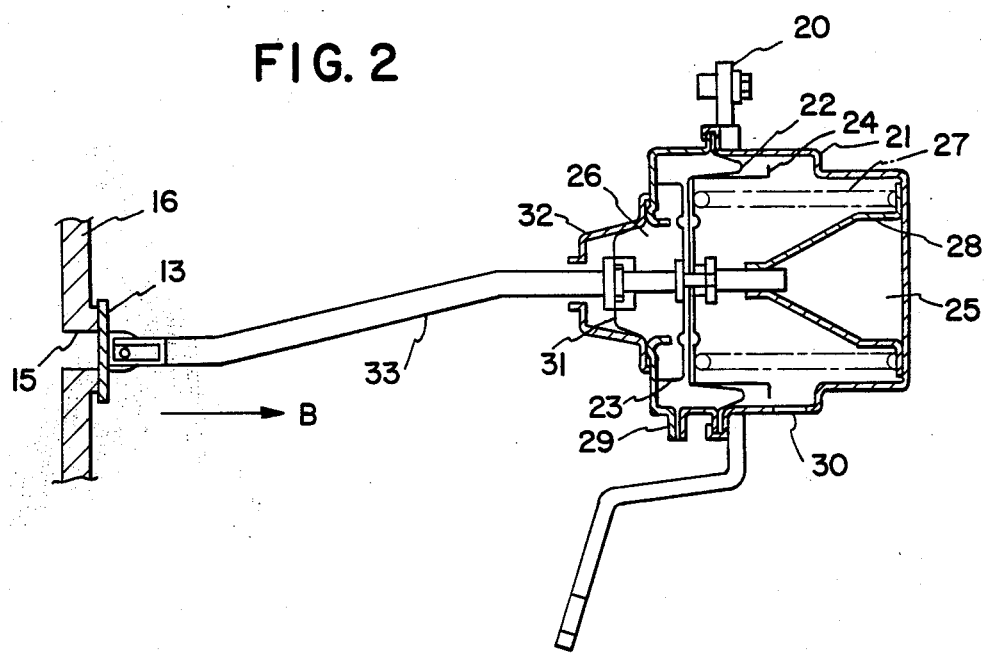
FIG. 2 is a sectional view showing one embodiment of the turbocharging pressure controlling apparatus according to the invention.

One embodiment of the invention will now be described with reference to one of the accompanying drawings. FIG. 2 is a sectional view showing a turbocharging pressure controlling apparatus embodying the invention. In FIG. 2, numeral 20 designates a bracket mounted to an internal combustion engine (not shown), a case 21 being mounted to the bracket 20. In the case 21 there is provided a rubber-made first diaphragm 22 held between a positive pressure-side holder 23 and an atmospheric side holder 24 so that the interior of the case 21 is divided into two chambers, namely, an atmospheric chamber 25 and a positive pressure chamber 26. A spring holder 28 is disposed on the interior surface of the atmospheric chamber 25, being opposite to the atmospheric side holder 24, and between the spring holder 28 and the atmospheric side holder 24 there is provided a spring 27 which normally urges the first diaphragm 22 toward the positive pressure chamber 26. A nipple 29 is mounted to the case 21, its front end facing one side wall of the positive pressure chamber 26. One side wall of the atmospheric chamber 25 is provided with a hole 30 through which the chamber 25 communicates with the open air. Further, a cover 32 is mounted to the side of the case 21 at the positive pressure chamber 26 side, and between the case 21 and the cover 32 there is mounted a second diaphragm 31 with its peripheral edge held therebetween. A rod 33 is mounted movably back and forth, extending through the atmospheric side holder 24, the first diaphragm 22, the positive pressure side holder 23, the second diaphragm 31, and further through the cover 32, its base end being fixed to the spring holder 28.

A control valve 13 is mounted to the front end of the rod 33. The valve 13 has a function to adjust the degree of opening of a flow diving hole 15 bored in an exhaust pipe 16 for guiding exhaust gas to a turbocharger (not shown) which operates to increase the pressure of air supplied to the internal combustion engine. Through this adjustment the pressure of air to be supplied from the turbocharger to the internal combustion engine is regulated.

In the turbocharging pressure controlling apparatus of the invention as above constructed, the spring 27 is compressed against its biasing force by air of several atmospheres introduced through the nipple 29 into the positive pressure chamber 26 and accordingly the rod 33 is caused to shift rightward in the direction of the arrow B, the flow dividing hole 15 being opened by the control valve 13. As a consequence, the amount of exhaust gas to be supplied to the turbine is reduced, the rotational speed of the turbine is lowered and the pressure of air to be supplied to the internal combustion engine is reduced.

As described above, the turbocharging pressure controlling apparatus according to the invention is so arranged that the rod is caused to move toward the case when the pressure of air to be supplied to the internal combustion engine is lowered. Therefore, it is possible to prevent such considerable layout change as has been required on the internal combustion engine side where the conventional arrangement is employed, which has made it difficult to achieve standardization. Further, with the conventional arrangement, the barcket and the rod are complicated in configuration and are not easy to manufacture, thus involving an unfavorable degree of component accuracy, with the result that such operational characteristics as required cannot be obtained. In contrast, according to the invention, those parts are simplified in configuration and stable working characteristics can be assured.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A turbocharging pressure controlling apparatus, comprising: a control valve (13) for regulating the pressure of air supplied to an internal combustion engine, and an air actuator comprising
   a case (21) having a fixed position relative to the internal combustion engine;
   a first diaphragm (22) disposed in said case and dividing the interior thereof into an atmospheric chamber (25) and a positive pressure chamber (26);
   a second diaphragm (31) disposed in said case for sealing a side of said positive pressure chamber opposite said atmospheric chamber;
   a rod (33) having a proximal end extending through said first and second diaphragms and outwardly of said case, and a distal end coupled to said control valve for actuating said valve by extension and retraction motions thereof;
   a compression spring (27) disposed in said atomspheric chamber for urging said first diaphragm toward said positive chamber when no positive pressure is supplied to said positive pressure chamber;
   a positive pressure supply nipple (29) for supplying positive pressure to said positive pressure chamber; and
   an aperture (30) in said case establishing continuous open communication between said atmospheric chamber and the surrounding atmosphere,
   wherein a retraction of said rod against the force of the spring resulting from the application of a positive pressure to said supply nipple opens the control valve to attendantly reduce the pressure of air supplied to the internal combustion engine.

* * * * *